(12) United States Patent
Ku (10) Patent No.: US 8,704,805 B2
(45) Date of Patent: Apr. 22, 2014

(54) SYSTEM AND METHOD FOR HANDLING IMAGE DATA TRANSFER IN A DISPLAY DRIVER

(75) Inventor: Tzong-Yau Ku, Tainan (TW)

(73) Assignee: Himax Technologies Limited, Sinshih Township (TW)

( * ) Notice: Subject to any disclaimer, the term of this patent is extended or adjusted under 35 U.S.C. 154(b) by 1038 days.

(21) Appl. No.: 12/763,164

(22) Filed: Apr. 19, 2010

(65) Prior Publication Data

US 2011/0254814 A1  Oct. 20, 2011

(51) Int. Cl.
*G06F 3/038*  (2013.01)

(52) U.S. Cl.
USPC ............... 345/204; 345/208; 345/94; 345/99; 713/500; 713/600

(58) Field of Classification Search
USPC ............. 345/204, 173, 214, 213, 87, 88, 99, 345/208, 94; 315/360; 713/500–503, 713/600–601
See application file for complete search history.

(56) References Cited

U.S. PATENT DOCUMENTS

| | | | |
|---|---|---|---|
| 7,307,609 B2 | 12/2007 | Chang | |
| 7,345,664 B2 | 3/2008 | Chang | |
| 2005/0286643 A1* | 12/2005 | Ozawa et al. | 375/242 |
| 2006/0125760 A1 | 6/2006 | Jee et al. | |
| 2008/0012746 A1* | 1/2008 | Zheng | 341/173 |
| 2008/0170643 A1* | 7/2008 | Lee | 375/340 |
| 2008/0246752 A1* | 10/2008 | Lee | 345/213 |
| 2008/0246755 A1* | 10/2008 | Lee | 345/214 |
| 2009/0015537 A1* | 1/2009 | Park et al. | 345/99 |
| 2009/0051675 A1* | 2/2009 | Huang | 345/204 |
| 2009/0167750 A1* | 7/2009 | Hong et al. | 345/213 |
| 2009/0251454 A1* | 10/2009 | Jang | 345/213 |
| 2010/0066723 A1* | 3/2010 | Nam et al. | 345/213 |
| 2010/0149082 A1* | 6/2010 | Hong et al. | 345/88 |
| 2010/0149083 A1* | 6/2010 | Park et al. | 345/99 |
| 2010/0156879 A1* | 6/2010 | Hong et al. | 345/213 |
| 2010/0156885 A1* | 6/2010 | Cho et al. | 345/214 |
| 2010/0164967 A1* | 7/2010 | Lee | 345/522 |
| 2010/0225620 A1* | 9/2010 | Lee | 345/204 |
| 2010/0265247 A1* | 10/2010 | Choe et al. | 345/214 |
| 2012/0200542 A1* | 8/2012 | Hong et al. | 345/204 |

FOREIGN PATENT DOCUMENTS

TW  200622978 A  7/2006
TW  200707373 A  2/2007

OTHER PUBLICATIONS

Taiwan Office Action, dated Sep. 9, 2013, 9 pages.

* cited by examiner

*Primary Examiner* — Lun-Yi Lao
*Assistant Examiner* — Priyank Shah
(74) *Attorney, Agent, or Firm* — Baker & McKenzie LLP (57) ABSTRACT

In a display driver, image data are assembled with synchronization information to form a stream of digital data. The stream of digital data is transmitted from a timing controller to a data driver along with a timing signal having phase-delayed pulses obtained from an external clock received by the timing controller. In response to the timing signal, the data driver can extract a synchronizing signal from the synchronization information embedded in the stream of digital data, and use the synchronizing signal for generating an internal clock signal. Encoded image data in the stream of digital data then can be retrieved according to the internal clock signal.

11 Claims, 6 Drawing Sheets

SYSTEM AND METHOD FOR HANDLING IMAGE DATA TRANSFER IN A DISPLAY DRIVER

FIELD OF THE INVENTION

The present invention relates to display devices and display drivers, and more particularly to systems and methods for handling image data transfer in a display driver.

DESCRIPTION OF THE RELATED ART

A display device of larger size typically requires higher frame resolution. As a result, higher frame rates and gray scale depths are needed for displaying images with a suitable quality. To meet these requirements, appropriate serial interfaces must be designed to provide high-speed transmission of image data through the driving system of the display device. In some conventional driving system, the image data and associated clock signal are transmitted through separate signal lines from a timing controller to a data driver. However, for high-frequency applications, the occurrence of phase drifts between the clock and image data signal may result in improper retrieval of the image data.

To remedy the above issue, one approach may consist of incorporating the clock signal in the transmitted stream of image data, so that no separate clock signal is required. Unfortunately, this approach requires the recovery of the clock and data portions from the stream of image data, which increases power consumption of the driving system. Moreover, the driving system has a larger layout area and more complex circuitry, which can be easily affected by noise interference.

Therefore, there is presently a need for a system and method for handling image data transfer in a display driver that can address the foregoing issues.

SUMMARY OF THE INVENTION

The present application describes a system and method for handling digital image data in a display driver. In one embodiment, a method of handling image data through a data driver is described. The method comprises receiving a stream of digital image data including a plurality of successive data packets, in response to a timing signal extracting a synchronizing signal from synchronization information embedded in the stream of digital image data, and according to the synchronizing signal, generating a clock signal for retrieving encoded image data from one of the data packets in the stream of digital image data.

According to another embodiment, a method of handling image data in a display driver comprises assembling a stream of digital data including image data and synchronization information inserted between the image data, and transmitting the stream of digital data along with a timing signal having a first voltage level and a second voltage level. The first voltage level timely overlaps with a first portion of the stream of digital data carrying the synchronization information, and the second voltage level substantially overlaps with a second portion of the stream of digital data carrying encoded image data.

According to yet another embodiment, a display system is described. The display system comprises a display panel, and a driving system comprising a timing controller, a scan driver and a data driver. The timing controller is configured to assemble a stream of digital data including image data and synchronization information inserted between the image data, and transmit the stream of digital data along with a timing signal having a first voltage level and a second voltage level, wherein the first voltage level timely overlaps with a first portion of the stream of digital data carrying the synchronization information, and the second voltage level substantially overlaps with a second portion of the stream of digital data carrying encoded image data. The data driver is configured to receive the stream of digital image data including a plurality of successive data packets, in response to the timing signal extract the synchronizing signal from synchronization information embedded in the stream of digital image data, and according to the synchronizing signal, generate a clock signal for retrieving image data from one of the data packets in the stream of digital image data.

At least one advantage of the systems and methods described herein is the ability for the data driver to generate a data clock in an accurate manner, based on a synchronization signal extracted from synchronization information embedded in the stream of digital data received from the timing controller. As a result, the data driver can retrieve encoded image data in a precise manner, and conventional issues related to phase drifts in the clock signal can be prevented.

DETAILED DESCRIPTION

The present application describes a system and method for handling image data transfer in a display driver. More specifically, the image data are assembled with synchronization information to form a stream of digital data. The stream of digital data is transmitted from a timing controller to a data driver along with a timing signal having phase-delayed pulses obtained from an external clock received by the timing controller. In response to the timing signal, the data driver can extract a synchronizing signal from the synchronization information embedded in the stream of digital data, and use the synchronizing signal for generating an internal clock signal. Encoded image data in the stream of digital data then can be retrieved according to the internal clock signal.

Figure 1:
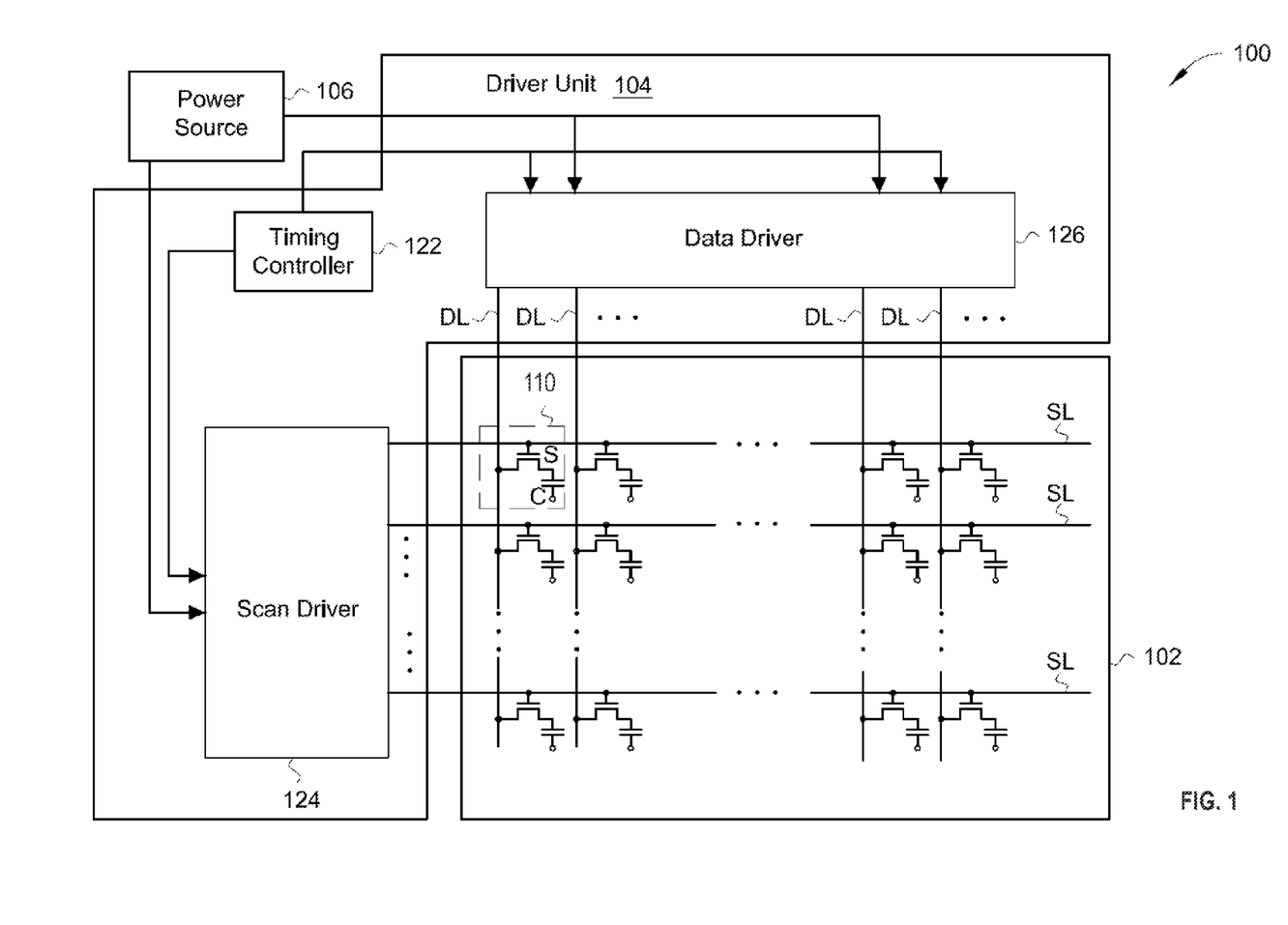
FIG. 1 is a schematic diagram illustrating one embodiment of a liquid crystal display device.

FIG. 1 is a schematic diagram illustrating one embodiment of a liquid crystal display device 100. The liquid crystal display device 100 includes a display panel 102, a driving system 104, and a power source 106. The display panel 102 comprises an array of pixels 110 operable under control of the driving system 104 for displaying an image. The driving system 104, powered by the power source 106, includes a timing controller 122, a scan driver 124, and a data driver 126. The timing controller 122 receives digital image data from a host device (not shown), generates control signals for the scan driver 124 and data driver 126, and transmits the digital image data to the data driver 126. The host device may include a computer graphics card, a computer central processing unit (CPU), a television adapter, or like display data sources. The scan driver 124 is coupled with horizontal rows of pixels 110 through multiple scanning lines SL, whereas the data driver 126 is coupled with vertical columns of pixels 110 through multiple data lines DL.

During a horizontal synchronizing period, the scan driver 124 turns on the TFTs coupled along one selected scanning line SL, whereas the data driver 126 converts image data provided by the host device into driving signals, and applies the driving signals through the data lines DL onto the turned-on TFTs to charge the associated capacitors C with display voltages corresponding to gray scale levels. Owing to a voltage difference between a common electrode (not shown) and the display electrodes applied with the display voltages latched by the storage capacitors C, liquid crystal molecules (not shown) in the display panel 102 are controllably oriented to achieve a desired light transmittance. Each horizontal row of pixels 110 is sequentially driven in this manner for displaying an image frame.

Figure 2:
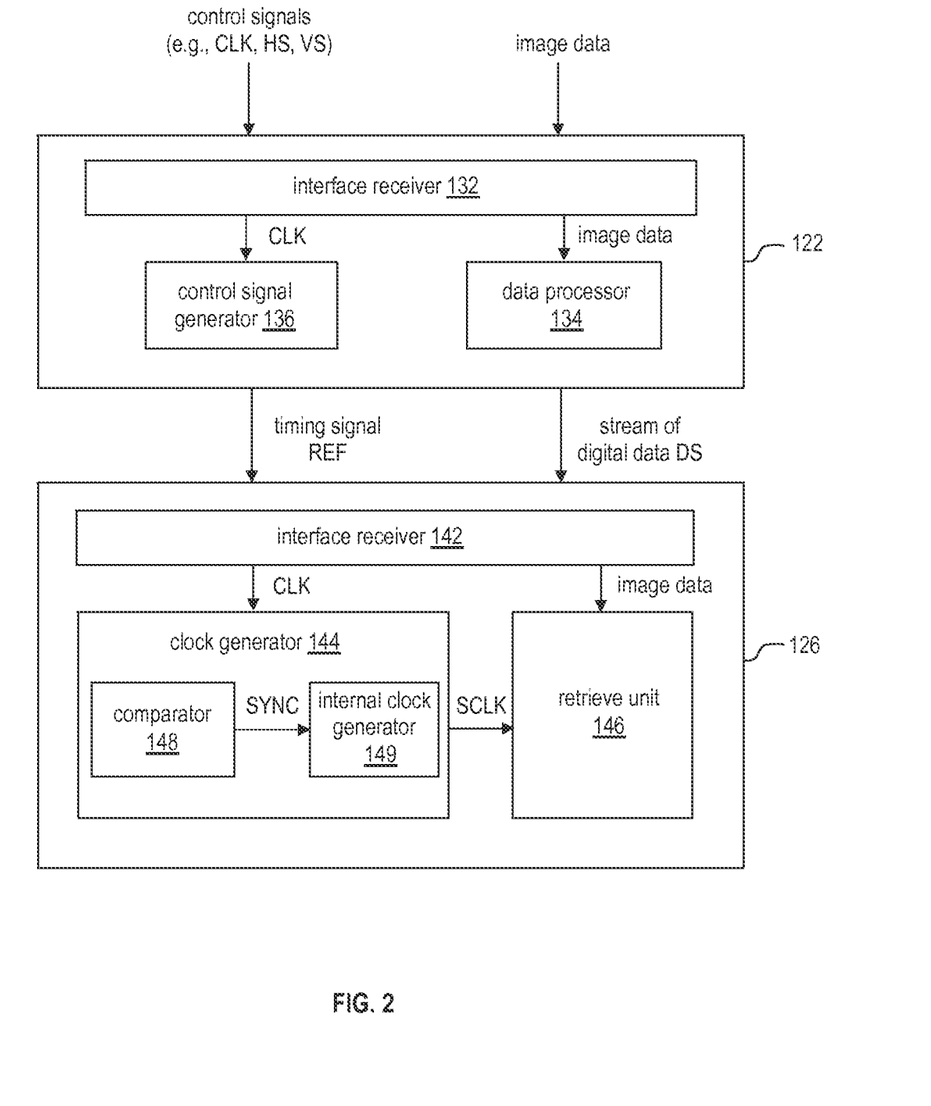
FIG. 2 is a block diagram illustrating an interface system for handling image data transfer between the timing controller and the data driver shown in FIG. 1.

FIG. 2 is a block diagram illustrating an interface system for handling image data transfer between the timing controller 122 and the data driver 126. The timing controller 122 can receive from a host device a plurality of first control signals and digital image data, assemble the image data with synchronization information to form a stream of digital data DS, and transfer the stream of digital data DS along with second control signals to the data driver 126. The first control signals can include an external clock signal CLK, and other various signals such as a horizontal synchronization signal HS, vertical synchronization signal VS. The stream of digital data DS can include a plurality of data packets P (shown in FIG. 3) that include encoded image data (e.g., in a red-green-blue (RGB) color format) and the synchronization information that can be used by the data driver 126 to generate an internal clock signal for retrieving the encoded image data. In one embodiment, the timing controller 122 can comprise an interface receiver 132, a data processor 134 and a control signal generator 136. Examples of the interface receiver 132 can include a low-voltage differential signaling (LVDS) receiver capable of receiving image data through a LVDS format, and pass the image data to the data processor 134. The data processor 134 can sample image data received from the interface receiver 132, and assemble the sampled image data with the synchronization information to form the stream of digital data DS. Based on the external clock signal CLK, the control signal generator 136 can generate a timing signal REF with timing pulses having phases delayed from the pulses of the external clock signal CLK. In particular, the control signal generator 136 may include a delay-locked loop (DLL) circuit or phase-locked loop (PLL) through which the external clock signal CLK is processed to generate the timing signal REF with phase-delayed pulses. The generated timing signal REF and stream of digital data DS can be then timely sent out to the data driver 126.

Figure 3A:
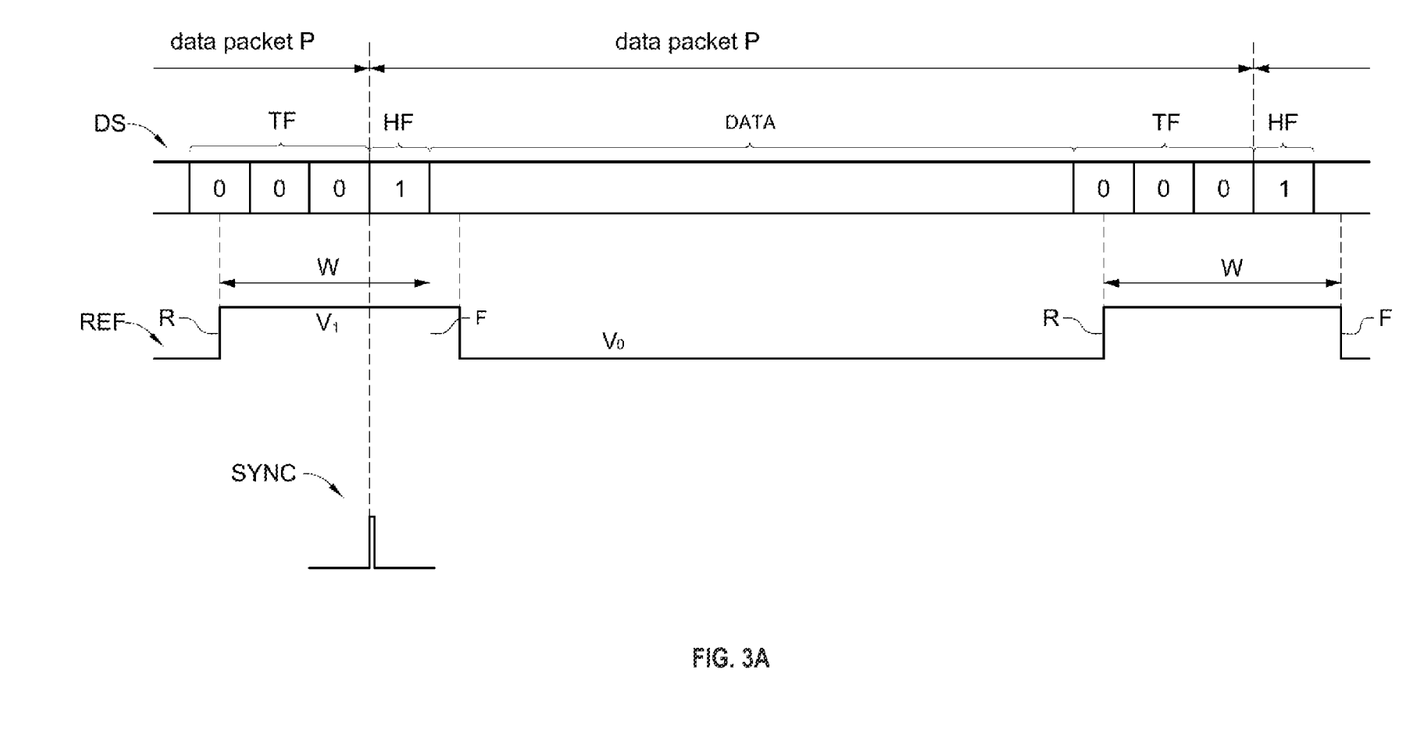
FIG. 3A is a timing diagram illustrating a sequence of image data and control signals transmitted from the timing controller to the data driver.
Figure 3B:
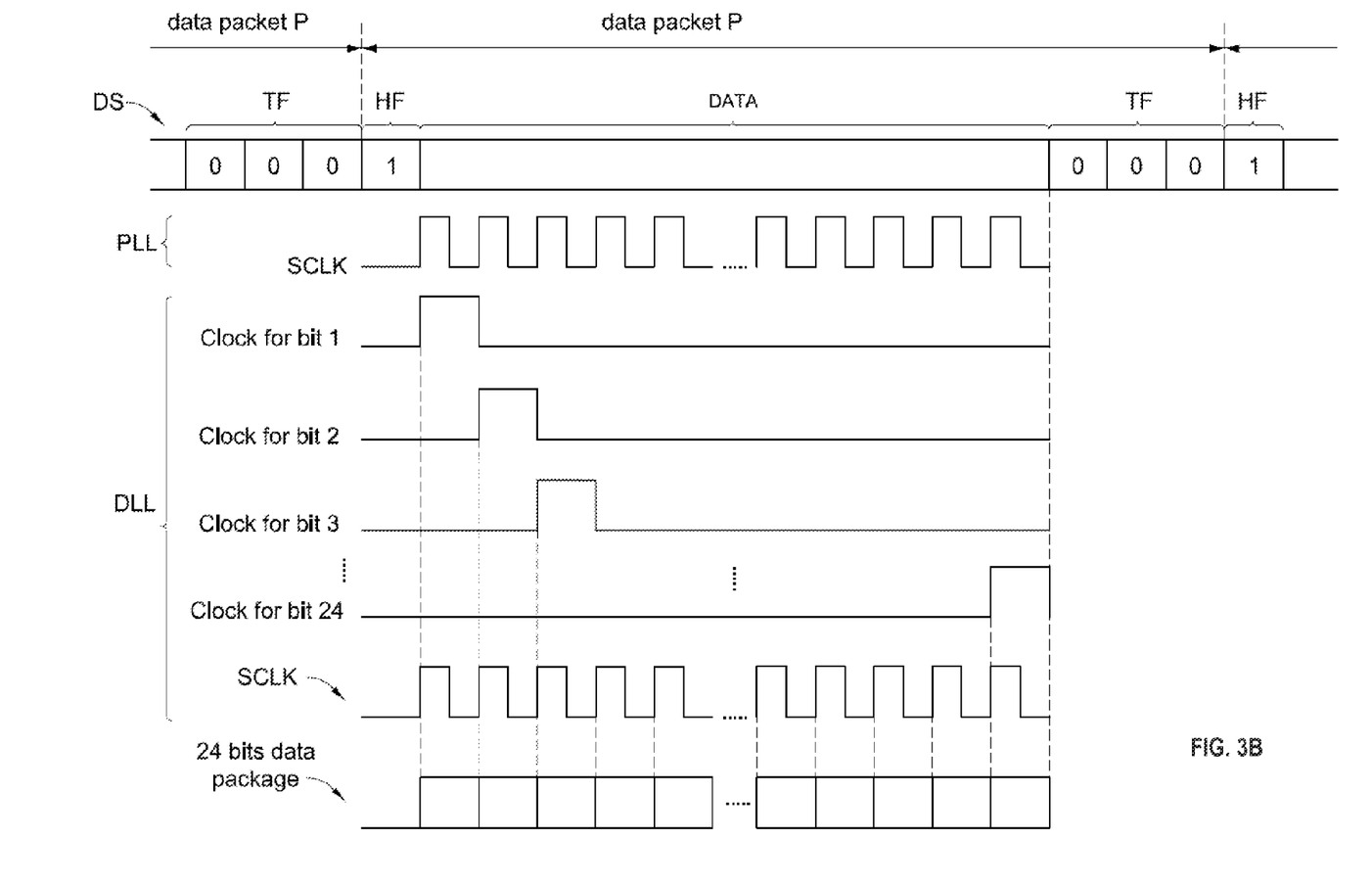
FIG. 3B is a timing diagram illustrating two exemplary sequences of the internal clock signal SCLK generated by the internal clock generator.

Referring again to FIG. 2, the data driver 126 can comprise a receiver interface 142, a clock generator 144, and a data retrieve unit 146. The receiver interface 142 can receive the stream of digital data DS and timing signal REF from the timing controller 122. According to the timing signal REF, the clock generator 144 can extract a synchronizing signal SYNC from the synchronization information embedded in the stream of digital data DS, and generate an internal clock signal SCLK (as shown in FIGS. 3A and 3B) for retrieving encoded image data from the stream of digital data DS. According to one embodiment, the clock generator 144 may include a comparator 148 and an internal clock generator 149. In particular, the internal clock 149 may be a delay-locked loop (DLL) circuit or phase-locked loop (PLL) through which the synchronizing signal SYNC is processed to generate the internal clock signal SCLK. The comparator 148 can compare the timing signal REF with a portion of the stream of digital data DS carrying the synchronization information for extracting the synchronizing signal SYNC. Based on the synchronizing signal SYNC, the internal clock generator 149 can generate an internal clock signal SCLK (FIG. 3) for retrieving encoded image data from the stream of digital data DS.

FIG. 3A is a timing diagram illustrating a sequence of image data and control signals transmitted from the timing controller 122 to the data driver 126. In response to control signals (including external clock signal CLK) and image data received from a host device, the timing controller 122 can assemble the received image data with synchronization information to form the stream of digital data DS, and then outputs the stream of digital data DS along with the timing signal REF to the data driver 126. The stream of digital data DS includes successive data packets P. As shown, the format of each data packet P can include a data field DATA containing encoded image data for each pixel, and synchronization information inserted in each boundary region between successive data packets P. In one embodiment, the data field DATA can contain 24 bits that can encode the image data for a pixel in the RGB color format, for example. The synchronization information can include a first field HF placed at the front of each data packet P adjacent to the data field DATA, and a second field TF placed at the tail of each data packet P adjacently after the data field DATA. Each bit in the first field HF is assigned with a first binary value, and each bit in the second field TF is assigned with a second binary value different from the first binary value. As data packets P are juxtaposed adjacent to one another, the first field HF of a next data packet P contiguously follows the second field TF of a previous adjacent data packet P. With reference to the embodiment illustrated in FIG. 3, the first field HF can exemplary contain one single bit set to the binary value 1, whereas the second field TF can contain three bits respectively assigned with the binary value 0. As a result, the formed synchronization information can be defined by the bit sequence "0001".

It is worth noting that other configurations of the synchronization information may be possible to differentiate the first field HF from the second field TF. For example, in alternate embodiments, each bit in the first field HF may be set to the value 0, and each bit in the second field TF may be set to the value 1.

Referring again to FIG. 3A, the timing signal REF can be produced by processing the external clock signal CLK inputted to the timing controller 122 through a delay-locked loop (DLL) circuit provided in the control signal generator 136. The timing signal REF includes a first voltage level $V_1$ (e.g., high level) corresponding to the amplitude of each pulse in the timing signal REF, and a second voltage level $V_0$ (e.g., low level). For each pulse in the timing signal REF, the rising edge R is approximately aligned with the second field TF of one data packet P (e.g., the bit sequence "000"), and the falling edge F is approximately aligned with (or can occur slightly after) the first field HF of the following data packet P (e.g., the bit "1"). As a result, each pulse width W corresponding to the first voltage level $V_1$ of the pulse can timely overlap with each respective portion of the stream of digital data DS that carries the synchronization information (e.g., the bit sequence "0001"). In turn, the second voltage level $V_0$ of the timing signal REF corresponds to the occurrence of portions in the stream of digital data DS that carry encoded image data (i.e., each data field DATA).

In response to a pulse rise in the timing signal REF, the data driver 126 can proceed to extract a synchronizing signal SYNC from the synchronization information embedded in the stream of digital data DS. More specifically, the comparator 148 (shown in FIG. 2) can compare the first voltage level $V_1$ of the pulse in the timing signal REF with the signal portion of the stream of digital data DS carrying the synchronization information. The comparator 148 can output a first signal state (e.g., low voltage level) as a result of the comparison between the timing signal REF and the signal portion of the synchronization information corresponding to the second field TF, and a second signal state (e.g., high voltage level) as a result of the comparison between the timing signal REF and the signal portion of the synchronization information corresponding to the first field HF. As the first field HF of the synchronization information has a bit value (e.g., binary value "1") that is distinctive from the second field TF (e.g., binary sequence "000"), the result outputted by the comparator 148 can be used to identify the first field HF of the synchronization information that precedes the encoded image data in the data field DATA. Accordingly, the synchronizing signal SYNC can be extracted from the synchronization information embedded in the stream of digital data DS upon identification of the distinct change of the result outputted by the comparator 148.

Upon identification of the first field HF, the second signal state of the comparator 148 can be used as a synchronization signal inputted to the internal clock generator 149 for generating the internal clock signal SCLK. The internal clock signal SCLK can start in synchronization with the second signal state of the comparator 148, and has clock pulses generated through the internal clock generator 149. The data retrieve unit 146 can then retrieve image data in the data field DATA according to the internal clock signal SCLK, and store the retrieve image data in an internal data register. During retrieval of image data in the data field DATA, the timing signal REF is at the second voltage level $V_0$ (e.g., low level). Once the encoded image data in the data field DATA have been extracted, the second field TF indicates the end of the data packet P. Upon a next pulse rise in the timing signal REF, the data driver 126 can then extract again a synchronizing signal SYNC, and initialize the internal clock signal SCLK for retrieving next image data in the same manner as described previously.

FIG. 3B is a timing diagram illustrating two exemplary sequences of the internal clock signal SCLK generated by the internal clock generator 149. As discussed previously, the internal clock generator 149 may be implemented with a DLL circuit or PLL circuit, through which the synchronizing signal SYNC is processed to generate the internal clock signal SCLK. When implemented with a DLL circuit, the internal clock generator 149 can proceed to generate a sequence of phase delayed pulse, each has a rising edge synchronizing with image data extracted from the data field of data packet P. When implemented with a PLL circuit, the internal clock generator 149 can proceed to multiply its base frequency to reach to a high frequency equal to the predetermined frequency of the internal clock signal SCLK (e.g. 1.04 G HZ).

In one embodiment, the encoded image data in each of the data field DATA can be include 24-bits data. Accordingly, the generated internal clock signal SCLK can be a periodic square waveform which rises synchronizing the edges of each bit in the 24-bits data field. The data retrieve unit 146 can then retrieve the 24-bits data according to the rising edges of the internal clock signal SCLK, and store the retrieved data.

With synchronization information embedded in each boundary region between successive data packets P outputted from the timing controller 122, the data driver 126 can thus synchronously generate the internal clock signal SCLK for retrieving image data in a precise manner. It is worth noting that rather than comparing the timing signal REF with the signal portion carrying the synchronization information as described previously, other methods are also possible for extracting the synchronizing signal from the synchronization information. For example, in response to the timing signal REF, the clock generator 144 may extract the synchronizing signal via direct reading of the bit value 1 in the first field HF after the sequence "000" of the second field TF.

Figure 4:
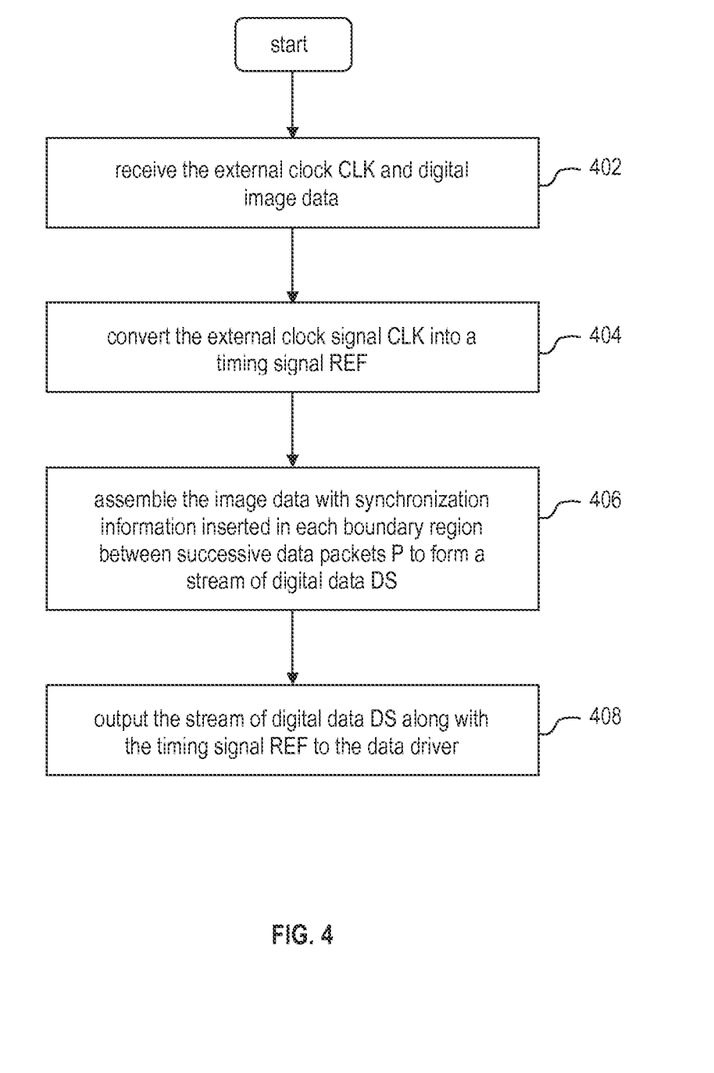
FIG. 4 is a flowchart of method steps performed by the timing controller for handling image data transfer to the data driver.

In conjunction with FIGS. 2 and 3, FIG. 4 is a flowchart resuming method steps performed by the timing controller 122 for transmitting image data to the data driver 126. In initial step 402, the timing controller 122 can receive the external clock signal CLK and image data from a host device. In next step 404, the timing controller 122 can convert the external clock signal CLK into the timing signal REF having phase-delayed pulses. For example, the timing signal REF can be generated by processing the external clock signal CLK through a Internal clock generating the control signal generator 136. In step 406, the timing controller 122 can assemble the received image data with synchronization information inserted in each boundary region between successive data packets P to form the stream of digital data DS. As described previously, the synchronization information can include a first field HF placed at the front of each data packet P in which each bit is assigned with a first binary value, and a second field TF placed at the tail of each data packet P in which each bit is assigned with a second binary value different from the first binary value. More specifically, in one embodiment, the first field HF can have one single bit set to 1 and the second field TF can three bits respectively set to 0 for forming the synchronization information "0001".

In step 408, the timing controller 122 can timely output the stream of digital data DS along with the timing signal REF to the data driver 126. Each pulse width W corresponding to the first voltage level $V_1$ of the outputted timing signal REF can timely overlap with each respective portion of the stream of digital data DS that carries the synchronization information. In turn, the second voltage level $V_0$ of the outputted timing signal REF corresponds to the occurrence of portions in the stream of digital data DS that carry encoded image data (i.e., each data field DATA). It is worth noting that the aforementioned steps 404 and 406 can be performed in any order, sequentially or in parallel.

According to the timing signal REF and synchronization information embedded in the stream of digital data DS, the data driver 126 can then extract a synchronizing signal SYNC to generate the internal clock SCLK used for retrieving image data from one data packet P in the stream of digital data DS.

Figure 5:
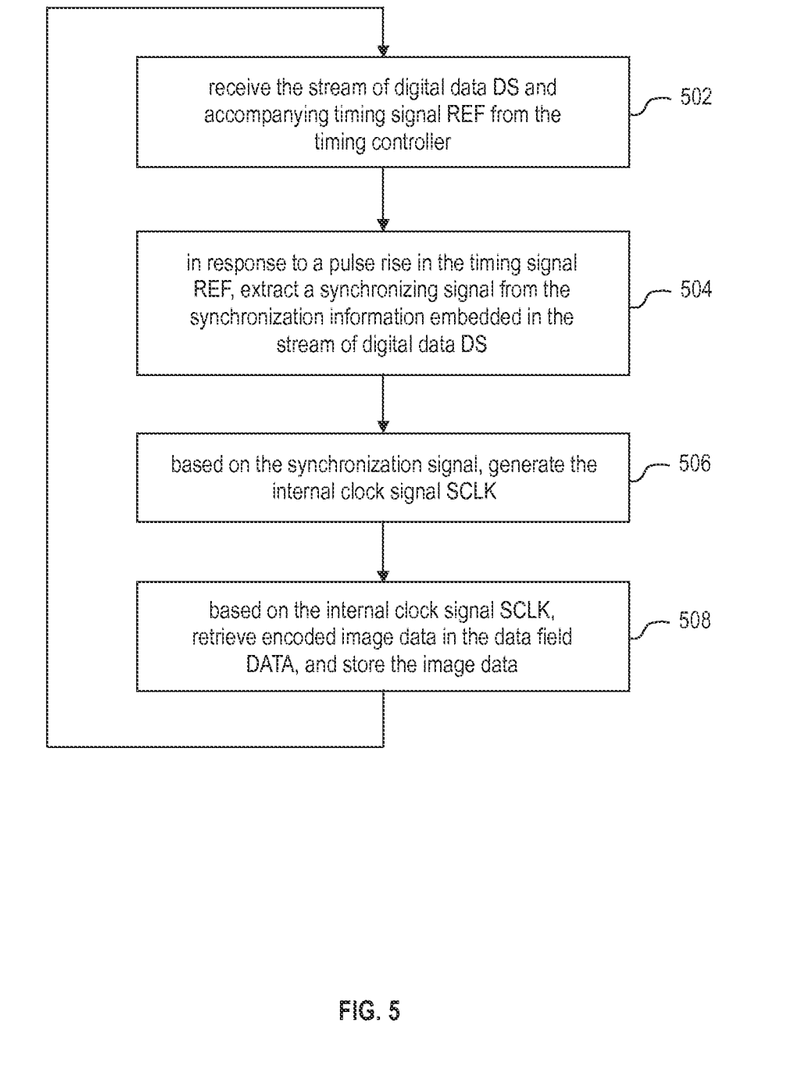
FIG. 5 is a flowchart of method steps performed by the data driver for retrieving image data from a stream of digital data received from the timing controller.

FIG. 5 is a flowchart that resumes method steps performed by the data driver 126 for retrieving image data from each data packet P. In initial step 502, the data driver 126 can receive the stream of digital data DS and accompanying timing signal REF from the timing controller 122. In step 504, in response to a pulse rise in the timing signal REF, the data driver 126 can extract a synchronizing signal SYNC from the synchronization information embedded in the stream of digital data DS. As described previously, the synchronization signal SYNC can be extracted from the synchronization information by comparing the timing signal REF with the synchronization information through the comparator 148, and identifying the occurrence of the first field HF. In step 506, based on the synchronization signal SYNC, the data driver 126 can then timely generate the internal clock signal SCLK. In step 508, based on the internal clock signal SCLK, the data driver 126 can then retrieve encoded image data in the data field DATA, and store the image data in a data register inside the data retrieve unit 146. Once retrieval of the image data from the data packet P is completed, steps 504-508 can be repeated for processing a next data packet P.

At least one advantage of the systems and methods described herein is the ability for the data driver to generate an internal data clock in an accurate manner, based on a synchronizing signal extracted from synchronization information embedded in the stream of image data received from the timing controller. As a result, the data driver can retrieve image data in a precise manner, and conventional issues related to phase drifts in clock signals can be prevented. Because the timing signal used for triggering extraction of the synchronizing signal does not have a high frequency, less constraint is imposed in the circuitry design of the timing controller. Moreover, since the synchronizing signals for retrieving the image data can be embedded between successive data packets P, the driving system can be advantageously operated in low frequency bandwidth. In contrast, because the conventional design needs each bit of the data package (such as a 24-bits data package) to synchronize with the internal clock, higher clock frequency (e.g., up to 1.04 G Hz) is required.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method for handling image data transfer in a display driver, comprising:
   receiving a stream of digital data including a plurality of successive data packets, and a timing signal that is distinct from the stream of digital data and is generated from a delay-locked loop or phase-locked loop circuit, the stream of digital data including synchronization information inserted in each boundary region between successive data packets, the synchronization information including a first field placed at the front of each of the data packets adjacent to a data field thereof and formed by one single bit that is assigned with a first binary value, and a second field placed at the tail of each of the data packets in which each bit is assigned with a same second binary value different from the first binary value, the first and second fields between each pair of successive data packets being adjacent to each other;
   in response to the timing signal, extracting a synchronizing signal from the synchronization information, wherein the step of extracting the synchronizing signal includes comparing the timing signal with a portion of the stream of digital data carrying the synchronization information, and generating the synchronizing signal upon detection in the synchronization information of a change of binary value from the second field to the first field adjacent thereto; and
   according to the synchronizing signal, generating a clock signal for retrieving encoded image data from one of the data packets in the stream of digital data.

2. The method according to claim 1, wherein the second field includes three bits respectively set to the second binary value.

3. The method according to claim 2, wherein the first binary value is 1 and the second binary value is 0.

4. The method according to claim 1, wherein the timing signal comprises a first voltage level and a second voltage level, wherein the first voltage level timely overlaps with a first portion of the stream of digital data carrying the synchronization information, and the second voltage level substantially overlaps with a second portion of the stream of digital data carrying encoded image data.

5. A method for handling image data transfer in a display driver, comprising:
   assembling a stream of digital data including image data and synchronization information inserted between the image data, the synchronization information including a first field placed adjacently at the front of each image data and formed by one single bit that is assigned with a first binary value, and a second field placed at the tail of each image data in which each bit is assigned with a same second binary value different from the first binary value, the first and second fields between each pair of successive image data being adjacent to each other;
   through a delay-locked loop or phase-locked loop circuit, generating a timing signal that is distinct from the stream of digital data, the timing signal having a first voltage level and a second voltage level different from each other;
   transmitting the stream of digital data and the timing signal;
   wherein the first voltage level timely overlaps with a first portion of the stream of digital data carrying the synchronization information, and the second voltage level substantially overlaps with a second portion of the stream of digital data carrying encoded image data; and
   receive the timing signal and the stream of digital data including a plurality of successive data packets;
   in response to the timing signal, extract a synchronizing signal from the synchronization information embedded in the stream of digital data, the synchronizing signal being extracted by comparing the timing signal with a portion of the stream of digital data carrying the synchronization information, and by generating the synchronizing signal upon detection in the synchronization information of a change of binary value from the second field to the first field adjacent thereto.

6. The method according to claim 5, wherein the second field includes three bits respectively set to the second binary value.

7. The method according to claim 6, wherein the first binary value is 1 and the second binary value is 0.

8. A display system comprising:
   a display panel; and
   a driving system comprising a timing controller, a scan driver and a data driver, wherein the timing controller is configured to:
      assemble a stream of digital data including data packets of image data and synchronization information inserted between the data packets, the synchronization information including a first field placed adjacently at the front of each data packet and formed by one single bit that is assigned with a first binary value, and a second field placed at the tail of each data packet in which each bit is assigned with a same second binary value different from the first binary value, the first and second fields between each pair of successive data packets being adjacent to each other;

process an external clock signal through a delay-locked loop or phase-locked loop circuit to generate a timing signal having a first voltage level and a second voltage level different from each other; and transmit the stream of digital data and the timing signal;

wherein the first voltage level timely overlaps with a first portion of the stream of digital data carrying the synchronization information, and the second voltage level substantially overlaps with a second portion of the stream of digital data carrying encoded image data; and the data driver is configured to:

receive the timing signal and the stream of digital data including the successive data packets;

in response to the timing signal, extract the synchronizing signal from the synchronization information embedded in the stream of digital data, the synchronizing signal being extracted by comparing the timing signal with a portion of the stream of digital data carrying the synchronization information, and by generating the synchronizing signal upon detection in the synchronization information of a change of binary value from the second field to the first field adjacent thereto; and according to the synchronizing signal, generate a clock signal for retrieving image data from one of the data packets in the stream of digital data.

9. The display system according to claim 8, wherein the synchronization information is inserted in each boundary region between successive data packets.

10. The display system according to claim 8, wherein the second field includes three bits set to the second binary value.

11. The display system according to claim 10, wherein the first binary value is 1 and the second binary value is 0.

* * * * *